US006268427B1

(12) United States Patent
Wang et al.

(10) Patent No.: US 6,268,427 B1
(45) Date of Patent: *Jul. 31, 2001

(54) ELASTOMERIC COMPOSITIONS FOR DAMPING

(75) Inventors: Xiaorong Wang; Victor J. Foltz, both of Akron; Michael W. Hayes, Canton, all of OH (US)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/252,585

(22) Filed: Feb. 18, 1999

(51) Int. Cl.⁷ .................................................. C08L 51/04
(52) U.S. Cl. ............................ 524/504; 524/534; 525/74; 525/78; 525/80
(58) Field of Search .............................. 525/74, 79, 80; 524/534, 504

(56) References Cited

U.S. PATENT DOCUMENTS

| | | | |
|---|---|---|---|
| 4,362,840 | 12/1982 | Tabar et al. | 524/525 |
| 4,399,239 | 8/1983 | Herwig et al. | 521/137 |
| 4,481,995 | 11/1984 | Ogawa et al. | 152/356 |
| 5,008,324 | 4/1991 | Killogoar et al. | 524/504 |
| 5,162,409 | 11/1992 | Mroczkowski | 524/262 |
| 5,225,498 | 7/1993 | Sorathia et al. | 525/454 |
| 5,494,981 | 2/1996 | Gorodisher et al. | 525/504 |
| 5,578,680 | 11/1996 | Ando et al. | 525/131 |
| 5,670,006 | 9/1997 | Wilfong et al. | 156/236 |
| 5,733,965 | 3/1998 | Scholl et al. | 524/513 |
| 5,905,116 * | 5/1999 | Wang et al. | 525/74 |
| 5,910,530 * | 6/1999 | Wang et al. | 524/534 |
| 5,912,296 | 6/1999 | Wang et al. | 524/534 |
| 5,994,468 | 11/1999 | Wang et al. | 525/178 |

FOREIGN PATENT DOCUMENTS

| | | |
|---|---|---|
| 0 585 012 A1 | 8/1993 | (EP) . |
| 924225 | 6/1999 | (EP) . |
| 955316 | 11/1999 | (EP) . |
| 955317 | 11/1999 | (EP) . |
| 955319 | 11/1999 | (EP) . |
| 955320 | 11/1999 | (EP) . |
| 955329 | 11/1999 | (EP) . |
| 964022 | 11/1999 | (EP) . |
| 964006 | 12/1999 | (EP) . |

OTHER PUBLICATIONS

"Scaling Concepts in Polymer Physics" by Pierre–Gilles de Gennes, *Cornell University Pree*, Ithaca, New York, pp. 140–143, 1979.

"Gelation and Critical Phenomena" by Stauffer et al., *Advances in Polymer Science 44*, pp. 103–153, 1982.

"Frequency Dependence of Viscoelastic Properties of Branched Polymers Near Gelation Threshold" by Durand et al., *Europhys. Lett. 3 (3)*, pp. 297–300, 1987.

"Wet Skid Properties of Filled Rubbers and the Rubber–Glass Transition" by Heinrich et al., *Rubber Chemistry and Technology, vol. 71*, pp. 53–61, 1998.

U.S. Pat. Application Ser. No. 09/252,566 filed on Feb. 18, 1999.

U.S. Pat. Application Ser. No. 09/252,516 filed on Feb. 18,1999.

U.S. Pat. Application Ser. No. 09/252,146 filed on Feb. 18, 1999.

Abstract of Japanese Patent No. 08 208892, Jan. 1995.

"Relationship Between Viscoelastic Properties and Gelation in Thermosetting Systems" by Tung et al., Journal of Applied Polymer Science, vol. 27, pp. 569–574 (1982).

"Stoppling of Crosslinking Reaction in a PDMS Polymer at the Gel Point" by Chambon et al., Polymer Bulletin, 13, pp. 499–503 (1985).

"Mesoscopoc Pictures of the Sol–Gel Transition: Ladder Models and Fractal Networks" Schiessel et al., Macromolecules 28, pp. 4013–4019 (1995).

"Relaxation Patterns of Nearly Critical Gels" by Mours et al., Macromolecules 29, pp. 7221–7229 (1996).

"Rheology of Polymers Near Liquid–Solid Transitions" by Winter et al., Advances in Polymer Science, vol. 134, pp. 165–193 (1997).

"Rheology of Polymers Near Liquid–Solid Transitions" by Winter et al., Advances in Polymer Science, vol. 134, pp. 225–234 (1997).

* cited by examiner

*Primary Examiner*—Tae H. Yoon
(74) *Attorney, Agent, or Firm*—David G. Burleson; Arthur M. Reginelli

(57) ABSTRACT

A method for increasing the damping properties of tire rubber comprising the steps of adding a saturated damping additive to a vulcanizable composition of matter, and processing the vulcanizable composition of matter containing the damping additive into tire rubber.

22 Claims, 1 Drawing Sheet

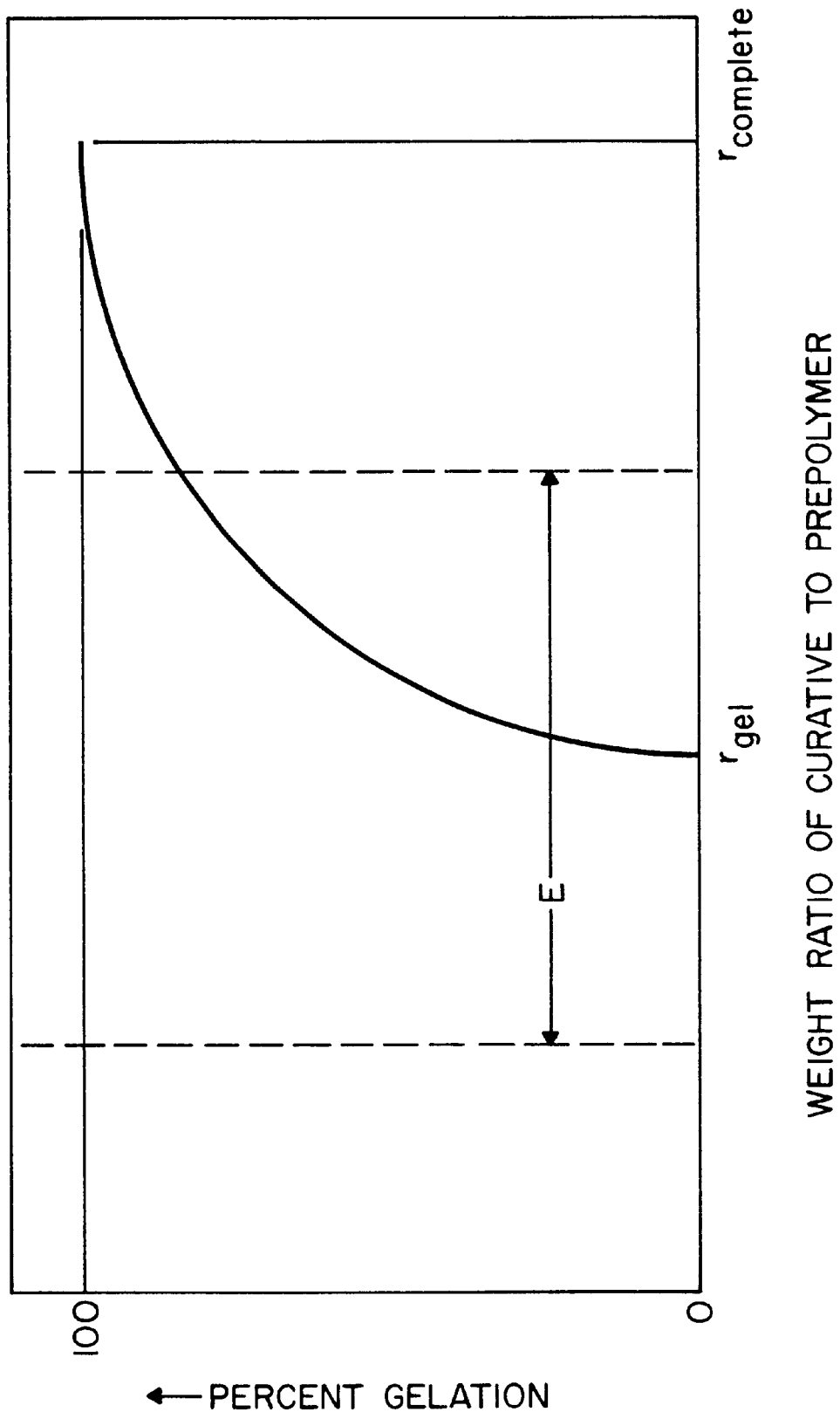

ELASTOMERIC COMPOSITIONS FOR DAMPING

TECHNICAL FIELD

This invention is generally directed toward compositions of matter that are useful for damping. More particularly, the compositions of this invention are elastomeric and exhibit improved damping capability over a wide temperature and frequency range due to the addition of a novel damping additive. One preferred embodiment of this invention includes using the novel high damping composition to fabricate tires and tire treads.

BACKGROUND OF THE INVENTION

Damping is the absorption of energy, such as vibrational or sound energy, by a material in contact with the source of that energy. It is desirable to damp or mitigate the transmission of vibrational energy from a number of sources such as motors, engines, and other power sources.

It is known to employ viscoelastic materials for damping applications. In general, energy, such as vibrational energy, is absorbed by the viscoelastic material and the energy is subsequently converted into heat rather than being transferred to the environment as vibrational energy. Ideally, the viscoelastic materials employed for dampening are useful and effective over a wide range of temperatures and frequencies.

The viscoelastic nature of materials can be mathematically represented by the formula $G^*=G'+iG''$ where $G^*$ is the complex shear modulus, $G'$ is the elastic or storage modulus, $G''$ is the viscous or loss modulus and $i=\sqrt{-1}$. The effectiveness of an viscoelastic material for damping purposes can be quantified by measuring its viscoelastic response to a periodic stress or strain. Results of dynamic mechanical tests are generally given in terms of elastic or storage modulus, $G'$, and viscous or loss modulus, $G''$. The loss modulus $G''$ is directly related to the amount of mechanical energy that is converted to heat, or in other words, damping.

The ratio of the loss modulus $G''$, to the elastic modulus, $G'$, is denoted by $$\tan(\delta) = \frac{G''}{G'}$$

which is a parameter that quantifies the ability of a material to dissipate mechanical energy into heat versus the purely elastic storage of mechanical motion during one cycle of oscillatory movement. The measurement of $\tan(\delta)$ can be made by a dynamic analyzer, and may be made by a sweep of frequencies at a fixed temperature, then repeating that sweep of frequencies at several other temperatures, followed by the development of a master curve of $\tan(\delta)$ versus frequency by curve alignment. An alternate method is to measure $\tan(\delta)$ at constant frequency over a temperature range.

In common practices, the $\tan(\delta)$ of a material is usually adjusted or broadened by taking advantage of the glass transition temperature of several materials within a temperature range. U.S. Pat. No. 5,494,981 teaches a composition that comprises resins that are cured in sequential fashion by using a single catalyst. The catalyst in this invention is a Bronsted acid, which activates an epoxy resin component and then activates cyanate trimerization into poly(triazines). The composition provides a glass transition damping peak around 100° C. and is understood to be heat stable over a temperature range of about 0° to at least 300° C.

U.S. Pat. No. 5,008,324 teaches a multi-phase thermoplastic elastomeric damping additive, and compositions containing the multi-phase thermoplastic elastomeric polymer. For example, a composition used for damping can include a soft crosslinked elastomeric binder containing microscopically discrete segments of the multi-phase thermoplastic elastomeric polymer. The multi-phase thermoplastic elastomeric polymer or damping additives have at least two polymeric phases including an initial linear or lightly linked polymeric phase and a second polymeric phase in the form of discrete domains dispersed within the initial polymeric phase.

U.S. Pat. No. 5,225,498 teaches a damping material that includes an interpenetrating polymer network having a soft polymer component made of polyurethane and a hard polymer component made of a vinyl ester polymer. The polyurethane and the vinyl ester polymer are polymerized in the presence of one another and cured at room temperature. The interpenetrating polymer network is taught to have an acoustic damping factor in excess of 0.2 over a temperature range of from about 15 to about 85° C., with a glass transition damping peak at about 55° C.

U.S. Pat. No. 5,670,006 teaches a composition for vibration damping, which includes an acrylate-containing thermoset resin that incorporates an interpenetrating network of polymerized epoxy monomer and polymerized acrylate monomers. The epoxy-acrylate thermoset resin is taught to have a glass transition temperature in the range of about −2° C. to about 200° C. at 1 Hz.

Although numerous compositions are known for damping, there is a need for improved damping compositions that exhibit a high degree of damping over a wide range of temperatures and frequencies without involving glass transition peaks. Enhancing hysteresis (tan ($\delta$)) by using super position of glass transition peaks is not desirable because the modulus of the material drops dramatically at or about the glass transition temperature.

SUMMARY OF INVENTION

It is, therefore, an object of the present invention to provide a composition of matter that is useful as a damping material without involving glass transition peaks.

It is another object of the present invention to provide a composition of matter that is useful as a damping material over a wide range of temperatures and frequencies without involving glass transition peaks.

It is yet another object of the present invention to provide a vulcanizable composition that is useful as a damping material, and provides damping over a wide temperature and frequency range without involving glass transition peaks.

It is still another object of the present invention to provide tire rubbers that exhibit increased damping over a wide temperature and frequency range.

It is another object of the present invention to provide tires having a high degree of damping.

It is still another object of the present invention to provide tires having improved traction and skid resistance.

At least one or more of the foregoing objects, together with the advantages thereof over the known art relating to damping materials, will become apparent from the specification that follows and are accomplished by the invention as hereinafter described and claimed.

In general the present invention provides a method for increasing the damping properties of tire rubber comprising the steps of adding a saturated damping additive to a vulcanizable composition of matter, and processing the vulcanizable composition of matter containing the damping additive into tire rubber.

The present invention also provides a tire component comprising a vulcanized elastomeric matrix, and from about 10 to about 1,000 parts by weight of a saturated damping additive per one hundred parts by weight rubber, where the damping additive is dispersed within the vulcanized elastomeric matrix.

BRIEF DESCRIPTION OF THE DRAWINGS

The FIGURE is a theoretical plot of a crosslinking reaction and shows the percent relation as a function of the ratio of crosslinking agent to prepolymer that is crosslinked.

PREFERRED EMBODIMENT FOR CARRYING OUT THE INVENTION

It has now been found that the addition of certain polymeric materials to an elastomeric composition of matter gives rise to rubber compounds having improved mechanical properties including improved damping. These polymeric materials, which may also be referred to as damping additives, are characterized by having a tan($\delta$) that is greater than or equal to about 0.35 in the temperature range from about −40° C. to about 120° C. Preferably, the tan($\delta$) is substantially constant within this temperature range. In a preferred embodiment, the damping additives are viscoelastic and therefore have a glass transition temperature that is less than or equal to about −20° C.

According to one embodiment of the present invention, at least one damping additive is added to an elastomeric binder or matrix. Preferably, the damping additive is miscible within the elastomeric matrix. A useful amount of damping additive includes from about 10 to about 1,000 parts by weight damping additive per one hundred parts by weight elastomeric binder (phr). Preferably, the damping additive is employed in an amount from about 30 to about 500 parts by weight phr, and even more preferably in an amount from about 50 to about 300 parts by weight phr.

Many elastomeric materials can be used as a binder or matrix. Useful elastomeric materials include, without limitation, natural and synthetic elastomers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber, polyurethane, and mixtures thereof. As used herein, the term elastomer will refer to a blend of synthetic and natural rubber, a blend of various synthetic elastomers, or simply one type of elastomer. The elastomers that are useful in practicing this invention include any of the various functionalized elastomers conventionally employed in the art of manufacturing rubber materials and tire rubbers.

The damping additive is typically blended with the elastomeric binder by dry mixing methods. For example, the dampening additive may be pre-blended with the binder and then the pre-blend or masterbatch can be compounded with optional fillers, vulcanizing agents, and other rubber additives. Alternatively, the dampening additive may be added directly to a vulcanizable composition of matter or binder that includes at least one elastomer as well as other optional rubber additives including fillers and vulcanizing agents. This mixing or blending preferably occurs in mixing apparatus that are conventionally employed in the art. For example, a mill or internal mixer can be employed. Alternatively, the damping additive can be blended in to the elastomeric binder while in solution. For example, the damping additive and polymeric matrix can be dissolved in a solvent and the solution can be subsequently blended. The solvent is then evaporated, which leaves behind the elastomer-damping additive mixture. Without excluding heterogeneous mixtures, it is preferred that the elastomeric matrix and the damping additive form a homogeneous blend; that is, discrete particles or domains of the elastomeric matrix or damping additive are not visible when using light scattering techniques.

Once the damping additive is added, the elastomeric matrix is cured or vulcanized by using techniques that are conventional in the art. Conventional vulcanization typically includes using vulcanizing agents in an amount from about 0.5 to about 4 parts by weight per hundred parts elastomeric binder (phr). For example, sulfur or peroxide-based curing systems may be employed. For a general disclosure of suitable vulcanizing agents one can refer to Kirk-Othmer, *Encyclopedia of Chemical Technology,* 3rd Edition, Wiley Interscience, N.Y. 1982, Vol. 20, pp. 365–468, particularly "Vulcanization Agents and Auxiliary Materials" pp. 390–402, or "Vulcanization" by A. Y. Coran, *Encyclopedia of Polymer Science and Engineering,* $2^{nd}$ Edition, John Wiley & Sons, Inc., 1989; both of which are incorporated herein by reference. Vulcanizing agents may be used alone or in combination. This invention does not affect cure processes and thus the matrix polymers can be cured using conventional processes. The cured elastomeric binder, which according to this invention will include a damping additive and optional other additives, will be referred to as a rubber product, vulcanizate, or simply rubber.

Once cured, the elastomeric matrix or rubber product containing the damping additive according to this invention is preferably soft and has a Shore A hardness that is less than or equal to about 80; more preferably, the Shore A hardness is less than or equal to about 50, and even more preferably less than or equal to about 40.

Where the damping additive does not contain a functionality that will react with a vulcanizing agent, vulcanization or curing of the elastomeric matrix will entrap the damping additive within the elastomeric network. On the other hand, where the damping additive contains unsaturation or a functionality that will react with a vulcanizing agent, vulcanization of the elastomeric matrix will cause the damping additive to likewise undergo crosslinking and become incorporated into the crosslinked elastomeric network.

Other components that may be added to the elastomeric binder or matrix include reinforcing fillers, plasticizers, antioxidants, processing aids, and dyes. In general, reinforcing fillers can preferably include carbon black and silica. The present invention should not be limited to the use of these fillers inasmuch as those practicing the invention can likewise employ mineral fillers such as clays, including hard clays, soft clays, and chemically modified clays, mica, talc (magnesium silicate), calcium carbonate, titanium dioxide, ground coal, ground and/or reclaimed rubber, magnesium hydroxide, alumina trihydrate, and mixtures thereof. For further explanation of rubber compounding and additives conventionally employed, one can refer to *The Compounding and Vulcanization of Rubber* by Stephens in RUBBERTECHNOLOGY, SECONDEDITION, Van Nostrand Reinhold Company (1973), which is incorporated herein by reference.

The damping additives employed in this invention are polymeric materials that are characterized by having a tan($\delta$) that is greater than or equal to about 0.35 in the temperature range from about −20° C. to about 120° C. Preferably, the tan($\delta$) within this temperature range is greater than or equal to about 0.50, and even more preferably greater than or equal to about 0.8. In an especially preferred embodiment, the damping additives are characterized by a substantially constant tan($\delta$) within the temperature range from about −20° C. to about 120° C. By substantially constant, it is meant that the tan($\delta$) within this range should not vary by more than 50 percent. Even more preferably, the tan($\delta$) should not vary by more than 30 percent, more preferably by not more than 20 percent, and even more preferably by not more than 10 percent. In a preferred embodiment, the damping additive is elastomeric and has a glass transition temperature that is less than or equal to about −20° C. More preferably its $T_g$ is less than or equal to about −35° C., and even more preferably it is less than or equal to about −50° C.

Several polymeric materials can be employed as the damping additive of this invention. Therefore, the selection of any one specific polymeric material exhibiting the desired properties should not limit the scope of the invention. Indeed, once provided with the knowledge of this invention, those skilled in the art will be able to select and synthesize other polymeric compositions for use as a damping additive.

Useful damping additives of this invention typically are made of branched and non-linear macro molecules. The branching may follow a regular structure, as in the case of centipede polymers, or an irregular or random structure, as in the case of hyper-branched polymers. For example, the so-called centipede polymers typically include a high molecular weight spine or backbone having connected thereto many relatively short side chains. It is, however, useful to note that not all regularly branched macromolecules exhibit the damping properties of this invention. For example, the so-called star architecture does not have the superior damping properties needed to materialize this invention.

In the case of the centipede structure, when practicing this invention the main polymeric chain, i.e., the spine, is much larger than the entanglement length. As known in the art, the entanglement length of a polymer chain is that number of polymer chain repeating units that correspond to a molecular weight sufficiently large for entanglements to occur between molecules of undiluted polymer. This has been measured as the molecular weight where the slope of a plot of log viscosity vs. log molecular weight changes from 1.0 to 3.4; the change being associated with intermolecular entanglements. In general, the entanglement length has been defined as that length of polymer resulting from about 100 polymer chain repeating units. For purposes of this specification, entanglement length will refer to a polymer chain length that includes a number of polymer chain repeating units that is on the order of magnitude of 100. For example, the entanglement length for polystyrene has been experimentally determined to be about 340 repeating units, a number that is on the order of magnitude of 100. Additional experimental techniques for determining the entanglement length of a polymer are summarized by W. W. Graessley in ADV. POLYM. SCI., Vol. 16, 1974. By much larger than the entanglement length, it is preferred that the main polymeric chain is greater than 10 times larger than the entanglement length, and even more preferably greater than 50 times the entanglement length. The relatively short side chains, on the other hand, should be smaller than or equal to three times the entanglement length. Examples of centipede polymers that can be used in this invention include poly(isobutylene-alt-n-alkylmaleimide), poly(n-alkylmaleimide-alt-alkenyl benzene). These centipede polymers are disclosed in co-pending applications including U.S. Ser. Nos. 097,034 and 995,791. Both of these applications and their resulting patents are incorporated herein by reference.

Other branched polymeric materials that are useful as damping additives include dendrimers. Dendrimers, in general, are described in great detail in DENDRITIC MOLECULES, CONCEPTS, SYNTHESES, PERSPECTIVES, by G. R. Neukome et al., (VCH Verlagsgesellschaft GmbH, 1996), which is incorporated herein by reference.

When practicing this invention, it is useful to use dendrimers where the length of any given dendritic branch is smaller than or on the order of the entanglement length. By smaller than the entanglement length, it is preferred that any given dendritic branch is smaller than five times the entanglement length, and even more preferably smaller than 10 times the entanglement length.

Still other branched polymeric materials that are useful as damping additives include hyper-branched polymers where the branching is random or irregular. A hyper-branched polymer refers to a polymeric composition, which includes more than one discrete polymer molecule, that has undergone some degree of crosslinking but is not fully cured. Full or complete cure occurs when a stoiciometrically equivalent amount of curative reacts with a stoiciometrically equivalent amount of polymer. Preferably, a hyper-branched polymer is formed when the degree of inter-chain reaction nears or approaches the gel point of the polymeric composition. For the purposes of this invention, the hyper-branched polymers may be referred to as near-gel polymers. The gel point is where one first observes the visible formation of a gel or insoluble polymer fraction within a polymeric composition. The gel in general is insoluble in all solvents at elevated temperatures under conditions where polymer degradation does not occur, and it theoretically corresponds to the formation of an "infinite" network in which polymer molecules have been crosslinked to one another to form a macroscopic molecule. The gel may then be considered one molecule and the non-gel portion of the polymer remains soluble in solvents and is often referred to as sol.

There are several techniques known in the art for estimating the gel point of polymeric compositions. Experimentally, the gel point can be determined by solvent extraction. This procedure is set forth in *Principles of Polymer Chemistry*, by Paul J. Flory. Other experimental procedures are also set forth therein. The skilled artisan will also appreciate that the gel point can be approximated by using theoretical calculations. In this regard, *Principles of Polymerization*, Third Edition, by George Odian, John Wiley & Sons, Inc., 1991, pp. 108–123, and *Principles of Polymer Chemistry*, by Paul J. Flory, pp. 46–47, are incorporated herein by reference.

In practicing the present embodiment, the skilled artisan should determine the gel point of the polymeric composition that is employed to create the hyper-branched polymer. For purposes of this specification, the polymeric composition that is employed to create the hyper-branched polymer may be referred to as the prepolymer system. Although the gel point can be discussed in terms of a number of parameters, it is convenient to determine the ratio of the weight of curative to the weight of prepolymer necessary to reach the gel point. Thus, the gel point can be represented by the weight of curative necessary to reach relation, $W_{curative-gel}$, over the weight of the prepolymer, $W_{prepolymer}$.

Likewise, the point of complete cure can be represented by the weight of curative necessary to reach complete cure, $W_{curative-complete}$, over the weight of the prepolymer $W_{prepolymer}$. In general, therefore, the extent of any curing reaction can be represented by the weight of curative added, $W_{curative}$, over the weight of the prepolymer, $W_{prepolymer}$. For purposes of this specification, the extent of reaction, r, can be represented by the weight of curative, $W_{curative}$, over the weight of the prepolymer, $W_{prepolymer}$, i. e., $W_{curative}/W_{prepolymer}$=r. Therefore, the extent of gelation $r_{gel}$, is $r_{gel}= W_{curative-gel}/W_{prepolymer}$, and the extent of complete cure is $r_{complete}=W_{curative-complete}/W_{prepolymer}$.

Thus, once the gel point of the prepolymer is determined, an appropriate amount of curative is added and reacted with the prepolymer to achieve a hyper-branched polymer. When selecting an appropriate amount of curative, those practicing the present invention should preferably attempt to approach the gel point without exceeding the gel point; although it should be understood that the definition of hyper-branched polymer broadly includes those reaction products of curative and prepolymer that exceed the gel point without actually reaching complete cure. Thus, in the preferred embodiment, the weight ratio that is employed to create a hyper-branched polymer is based on the following formula:

$$E = \frac{|r - r_{gel}|}{r_{gel}}$$

where E is the relative distance to the gel point, r is the extent of the reaction, and $r_{gel}$ is the extent of the reaction at the gel point. Generally, E should be less than or equal to 1, preferably less than about 0.5, more preferably less than about 0.2, still more preferably less than about 0.1, and even more preferably equal to or less than 0.05. It should be understood that the foregoing formula includes absolute value brackets and therefore the extent of the reaction, r, is a relative distance, E, beyond the gel point, as well as a relative distance, E, before the gel point. This is best understood with reference to FIG. 1. Here, the relative distance around the gel point, i.e., +/−E, is shown. According to this invention, a hyper-branched polymer is formed when the extent of reaction, r, is within this range.

For example, where one determines the gel point of a particular polymeric composition to be about 0.5 parts of curative per part of prepolymer, a hyper-branched polymer can be obtained by reacting the polymeric composition with about 0.3 parts of curative per part of the prepolymer. In this case, the relative distance E=(|0.3−0.5|)/(0.5)=0.4. In another example, where one again determines the gel point of a particular polymeric composition to be about 0.5 parts of curative per part of prepolymer, a hyper-branched polymer can be obtained by reacting the polymeric composition with about 0.7 parts of curative per part of the prepolymer. In this case, the relative distance, E=(|0.7−0.5|)/(0.5)=0.4.

With specific regard to the embodiment wherein hyper-branched polymers are employed, the prepolymer that is selected for preparing the hyper-branched polymer should include at least one functional group. Preferably the prepolymer will include at least two functional groups, more preferably between two and about ten functional groups, and even more preferably between two and about five functional groups. For purposes of this specification, the prepolymer may be referred to as the functionalized prepolymer. The functional groups can be located at the terminal end of the prepolymer, including the initiated end of the polymer, or along the backbone of the prepolymer. Therefore, crosslinking of the prepolymer can occur by way of end-linking or random-linking.

The functionalized prepolymers that are usefully employed in preparing the hyper-branched polymers can include any of the sundry functional groups that are commonly incorporated in, or grafted to, polymers. Accordingly, the present invention is not limited by any particular functional group. For example and without limitation, functional groups can include primary amino groups ($NH_2$), secondary amino groups (NH), hydroxyl groups (OH), carboxyl groups (COOH), vinyl groups ($RCHCH_2$), epoxy groups, anhydride groups, acyl halide groups (RCOCl), carboxylic acid anhydride groups (RCOOCOR), carboxamide groups ($RCONH_2$), and isocyanate groups (RNCO). As noted above, these functional groups can be located anywhere along the prepolymer backbone including the ends of the prepolymer. Additional examples and a further discussion of functionalized prepolymers is contained in *Reactive Extrusion: A Survey of Chemical Reactions of Monomers and Polymers During Extrusion Processing*, by Brown, REACTIVE EXTRUSION PRINCIPLES AND PRACTICE, edited by Xanthos, Hanser Publishing, (1992), which is incorporated herein by reference.

Any polymeric macromolecule can be selected and functionalized to form the functionalized prepolymers. Accordingly, the scope of the present invention should not be limited by the selection of any one polymer. Preferably, however, the prepolymers are elastomeric. As noted above, these elastomers can be unsaturated and are therefore capable of being vulcanized after formation of the hyper-branched polymers. In another embodiment, the prepolymer containing a functional group or groups is an elastomer that contains little or no unsaturation, and therefore the resulting hyper-branched polymer is not crosslinked with the elastomeric matrix upon vulcanization of that matrix. Instead, the hyper-branched polymer is entrapped within a crosslinked elastomeric network. For purposes of this specification, a saturated elastomer will refer to those elastomers where less than about five weight percent of the polymer includes curable double bonds. Preferably, saturated elastomers are those where less than about three weight percent of the polymer includes curable double bonds, more preferably where less than about one weight percent of the polymer includes curable double bonds, and even more preferably less than about 0.5 weight percent of the polymer includes curable double bonds.

For example, the functionalized prepolymer can include, without limitation, unsaturated elastomers such as polybutadiene, polyisoprene, styrene-butadiene copolymer, ethylene-propylene-diene terpolymer, nitrile rubber, fluoroelastomers, polyurethane, natural rubber and silicone rubber. Examples of saturated polymers that may be functionalized in obtaining the functionalized prepolymers of this embodiment include ethylene-propylene copolymer, polyisobutylene, butyl rubber, hydrogenated copolymers such as styrene-butadiene copolymer, hydrogenated polyisoprene, and hydrogenated high-vinyl polybutadiene. Each of these elastomers are well known in the art and are commercially available from a number of sources. Also, because these polymers are well known in the art, there are a number of synthetic techniques known and published that can be employed in preparing these polymers. These techniques include, but are not limited to, anionic polymerization, cationic polymerization, Ziegler-Natta polymerization, and radical chain polymerization including free radical polymerization. One can refer to *Principles of Polymerization*, Third Edition, by George Odian for additional information on the various techniques that can be employed in making polymers.

The molecular weight of the functionalized prepolymer can vary. In a preferred embodiment, the molecular weight—number average molecular weight (Mn)—of the polymeric backbone or prepolymer should be between about 1,000 and about 100,000, more preferably between 1,000 and about 80,000, and even more preferably between about 2,000 and about 50,000. As for the degree of functionalization of the prepolymer, there should be at least one functional group per one hundred repeating units within the polymer. Stated another way, there should be at least one functional group per entanglement molecular weight.

The crosslinking agents that can be employed to react with the functionalized prepolymer and thereby form the hyper-branched polymers include any of the sundry crosslinking agents that are known in the art. The one proviso, of course, is that the crosslinking agent must be capable of reacting with and forming a covalent bond with the functional group on or within the functionalized prepolymer. In order to be effective, the crosslinking agent should at least be difunctional. In other words, the crosslinking agent should contain at least two functional groups that will react with functional groups on the prepolymer molecules. Preferably, the crosslinking agent should contain between two and about 10 functional groups, and more preferably between 2 and about 5 functional groups. For purposes of this specification, these agents may be referred to as multi-functional crosslinking agents. These functional groups can include, without limitation, primary amino groups ($NH_2$), secondary amino groups (NH), hydroxyl groups (OH), carboxyl groups (COOH), vinyl groups ($RCHCH_2$), epoxy groups, anhydride groups, acyl halide groups (RCOCL), carboxylic acid anhydride groups (RCOOCOR), carboxamide groups ($RCONH_2$), and isocyanate groups (RNCO). Accordingly, practice of the present invention should not be limited by the crosslinking agent selected. Some specific crosslinking agents that are useful in practicing this embodiment and that are conventional in the art include, without limitation, diisocyanates, phenolic resins including resole phenolics and novolac phenolics, diamines, dihydroxyl ethane, and dicarboxyl ethane.

Those skilled in the art will be able to readily select an appropriate functionalized prepolymer and complementary crosslinking agent to carry out the hyper-branching or crosslinking reaction. Preferably, the crosslinking reaction will be a single step reaction. For example, 2,4-diisocyanate will react with and crosslink a hydroxy functionalized prepolymer. Other single-step reactions include, but are not limited to, ester reactions that take place between carboxyl and hydroxyl groups, amide reactions that take place between amino groups and carboxyl groups, urethane reactions that take place between isocyanate groups and hydroxyl groups, epoxy reactions that take place between epoxy groups and amino groups, and imide reactions that take place between anhydride groups and amino groups. Preferred reactions include those that do not generate small molecules, such as urethane and epoxy reactions. For a further understanding of these reactions, one can refer to Reactive Extrusion, by Brown, discussed hereinabove.

Those skilled in the art will be able to readily select the appropriate reaction conditions necessary to achieve hyper-branched polymers. In other words, the reaction between a functional group and a crosslinking agent is conventional in the art and can be carried out without undue calculation or experimentation. Under certain circumstances, it should be appreciated that a catalyst may be needed in order to effect the crosslinking reaction. When used, those catalysts that do not deleteriously impact the final composition should be selected.

In one preferred embodiment of this invention, the damping additive is added to a vulcanizable composition of matter that is useful for making tire rubber. Here, the damping additive is added in an amount from about 10 to about 1,000 parts by weight per hundred parts rubber (phr). Even more preferably, the damping additive should be added in an amount from about 10 to about 300 parts by weight phr. It has been found that the addition of the damping additives according to the present invention improves the overall traction of tire rubber including wet traction, snow traction, and dry traction. Advantageously, the wet traction of tire rubber, as predicted by hysteresis loss at 5° C., can be improved by at least 10 percent, even more advantageously by at least 20 percent, and even more advantageously by about 30 percent. Likewise, the snow traction of tire rubber, as predicted by hysteresis loss at –5° C., can be improved by at least 10 percent, more advantageously by at least 20 percent, and even more advantageously by about 30 percent.

Although damping additives are added to vulcanizable compositions of matter that are useful for fabricating tire rubber, practice of this invention does not alter the type or amount of other ingredients typically included within these vulcanizable compositions of matter. Accordingly, practice of this invention is not limited to any one particular vulcanizable composition of matter or tire compounding stock.

Typically, these vulcanizable compositions of matter include an elastomer component that is blended with reinforcing fillers and at least one vulcanizing agent. These compositions typically also include other compounding additives such as accelerators, oils, waxes, scorch inhibiting agents, and processing aids. As known in the art, vulcanizable compositions of matter containing synthetic rubbers typically include antidegradants, processing oils, zinc oxide, optional tackifying resins, optional reinforcing resins, optional fatty acids, optional peptizers, and optional scorch inhibiting agents.

These vulcanizable compositions are compounded or blended by using mixing equipment and procedures conventionally employed in the art. Preferably, an initial masterbatch is prepared that includes the elastomer component and the reinforcing fillers, as well as other optional additives such as processing oil and antioxidants. According to this invention, it is preferred to add the damping additive during preparation of the initial masterbatch. Once this initial masterbatch is prepared, the vulcanizing agents are blended into the composition. This vulcanizable composition of matter can then be processed according to ordinary tire manufacturing techniques including standard rubber curing techniques. For further explanation of rubber compounding and the additives conventionally employed, one can refer to The Compounding and Vulcanization of Rubber, by Stevens in RUBBER TECHNOLOGY SECOND EDITION (1973 Van Nostrand Reihold Company), which is incorporated herein by reference. Tires can be produced from this tire rubber by using techniques conventionally employed in the art.

The elastomers that are typically employed within vulcanizable compositions of matter that are useful for making tires include both natural and synthetic elastomers rubbers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomer, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. As used herein, the term elastomer or rubber will refer to a blend of synthetic and natural rubber, a blend of various synthetic rubbers, or simply one type of elastomer or rubber. Also, the elastomers that are useful in practicing this invention include any of the various functionalized elastomers that are conventionally employed in the art of making tires.

The reinforcing agents, such as carbon black or silica, typically are employed in amounts ranging from about 1 to about 100 parts by weight per 100 parts by weight rubber (phr), with about 20 to about 80 parts by weight (phr) being preferred, and with about 40 to about 80 parts by weight (phr) being most preferred. The carbon blacks may include any of the commonly available, commercially-produced carbon blacks, but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Typical values for surface areas of usable carbon blacks are summarized in the following table.

| CARBON BLACKS | |
| --- | --- |
| ASTM Designation (D-1765-82a) | Surface Area ($m^2/g$) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds used may be in pelletized form or in unpelletized flocculent mass. Preferably, for more uniform mixing, unpelletized carbon black is preferred.

With respect to the silica fillers, the vulcanizable compositions of the present invention may preferably be reinforced with amorphous silica (silicon dioxide). Silicas are generally referred to as wet-process, hydrated silicas because they are produced by a chemical reaction in water, from which they are precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

When employed, silica can be used in the amount of about 1 part to about 100 parts by weight per 100 parts of polymer (phr), preferably in an amount from about 5 to about 80 phr. The useful upper range is limited by the high viscosity imparted by fillers of this type. Usually, both carbon black and silica are employed in combination as the reinforcing filler. When both are used, they can be used in a carbon black:silica ratio of from about 10:1 to about 1:2. Some of the commercially available silicas that may be used include: Hi-Sil®215, Hi-Sil®233, and Hi-Sil®190, produced by PPG Industries. Also, a number of useful commercial grades of different silicas are available from a number of sources including Rhone Poulenc. Typically, a coupling agent is added when silica is used as a reinforcing filler. One coupling agent that is conventionally used is bis-[3 (triethoxysilyl)propyl]-tetrasulfide, which is commercially available from Degussa, Inc. of New York, N.Y. under the tradename SI69.

The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, ENCYCLOPEDIA OF CHEMICAL TECHNOLOGY, $3^{rd}$ Edition, Wiley Interscience, N.Y. 1982, Vol. 20, pp. 365–468, particularly VULCANIZATION AGENTS AND AUXILIARY MATERIALS pp. 390–402, or VULCANIZATION by A. Y. Coran, ENCYCLOPEDIA OF POLYMER SCIENCE AND ENGINEERING, $2^{nd}$ Edition, John Wiley & Sons, Inc., 1989; both of which are incorporated herein by reference. Vulcanizing agents may be used alone or in combination. This invention does not appreciably affect cure times, and thus the polymers can be cured for a conventional amount of time. Typically, vulcanization is effected by heating the vulcanizable composition of matter; e.g., it is heated to about 170° C. Cured or crosslinked polymers will be referred to as vulcanizates for purposes of this disclosure.

In other embodiments of this invention, damping additives are added to elastomeric compositions of matter that are useful for fabricating damping and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances. For example, these materials could be used in air-conditioners, laundry machines, refrigerators, electric fans, vacuums, driers, printers and ventilator fans. Further, these materials are also suitable for impact absorbing or damping materials in audio equipment and electronic or electrical equipment. For example, these materials could be used in compact disc players including portable units and those within vehicles, video cassette recorders, radio cassette recorders, microphones, insulators for disc drives within computers, various holders for optical disc readers, microphones, or speakers including those within portable and cellular telephones. Still further, these materials are useful in sporting goods and shoes.

In order to demonstrate the practice of the present invention, the following examples have been prepared and tested as described in the Experimental Section disclosed hereinbelow. The examples should not, however, be viewed as limiting the scope of the invention. The claims will serve to define the invention.

GENERAL EXPERIMENTATION

Experiment I

Four tire stocks were prepared according to the general recipe set forth in Table I.

TABLE I

| | Parts by Weight |
|---|---|
| Elastomeric Binder | 100 |
| Carbon black | 80 |
| Damping Additive | 50 |
| Stearic Acid | 1.5 |
| Wax | 1 |
| Antioxidant | 1 |
| Zinc Oxide | 2.5 |
| | 186 |
| Sulfur | ~1.7 |
| Diphenylguanidine | 0.6 |
| N-tert-butyl-benzothiazolesulfenamine | 0.35 |
| Benzothiazyl disulfide | 0.7 |
| | 3.35 |
| | 189.35 |

The elastomeric binder was a butadiene rubber obtained from the Firestone Synthetic Rubber Company under the tradename D-40NF. The carbon black was an intermediate super abrasion furnace black that is commercially available from a number of sources. The antioxidant was N-(1,3 dimethylbutyl)-N'-phenyl-p-phenylene-diamine is likewise available from a number of sources. Also, the diphenylguanidine, N-tert-butyl-benzothiazolesulfenamine, and benzolthiazyl disulfide accelerators that were used are conventionally used in the art and are commercially available from many sources. Similarly, the antioxidant, stearic acid, wax, zinc oxide, sulfur an other ingredients that were employed are conventionally employed in the art and are commercially available from many sources.

Each of the four stocks that were prepared included a different damping additive. The first stock included a linear liquid butadiene; the second stock included a light aromatic processing oil; the third stock included a heavy aromatic processing oil; and the fourth stock included a hyper-branched polymer in accordance with this invention.

The linear liquid butadiene rubber was obtained from Aldrich Chemical Company and was characterized by having 47.9 weight percent trans-1,4 microstructure, 44.0 percent cis-1,4 microstructure, and 12.1 weight percent vinyl-1,2 microstructure. The light aromatic processing oil was obtained from The Shell Chemical Company under the tradename Durex 727, and the heavy aromatic processing oil was obtained from Witco Chemical Company under the tradename Califlux 55.

The hyper-branched polymer was prepared by crosslinking a liquid hydroxy-terminated polybutadiene prepolymer with toluene 2,4-diisocyanate. The hydroxy-terminated butadiene prepolymer was obtained from Aldrich Chemical Company and was characterized by having 52.1 percent by weight trans-1,4 microstructure, 22.4 percent by weight cis-1,4 microstructure, and 25.5 percent by weight percent vinyl-1,2 microstructure. The prepolymer was also characterized by a viscosity of 44.1 poise. The hydroxyl value of the prepolymer was measured by using a method in which the hydroxyl groups were esterified by acetic anhydride in pyridiene, and the resulting acid was titrated with a standard base. According to this procedure, the hydroxyl value was estimated to be 0.903 mmol/g. The molecular weight was determined by GPC using polystyrene as the standard. This analysis gave an number average molecular weight ($M_n$) of 2,900, and an average molecular weight ($M_w$) of 6,100.

From these analytical results, the functionality of the polymer was calculated to be about 2.62. The 2,4 diisocyanate was obtained from Aldrich, had a purity of 99 percent, and was used without further purification.

With specific regard to the preparation of the hyper-branched polymer, various reaction mixtures were prepared as follows. The mixture of prepolymer and crosslink agent was vigorously stirred at about 22° C. for 30 minutes in order to dissolve the 2.4 diisocyanate into the prepolymer. Each sample was then allowed to react at about 70° C. for about three days. Specifically, the hyper-branched polymer that was chosen was prepared from a mixture of 300.46 g of butadiene prepolymer and 12.475 g of 2,4 diisocyanate. Notably, this hyper-branched polymer showed the high $\tan(\delta)$ properties. The damping properties were tested on a temperature range of from about 20 to about 100° C., and also on a frequency range of from about 0.01 to about 10 Hz. Over this range of conditions, the hyper-branched polymer demonstrated a $\tan(\delta)$ of 1.1±0.2. The $T_g$ of the hyper-branched polymer is about –60° C., as determined by DSC.

In preparing the elastomeric composition that contains the damping additive, the elastomeric binder and the damping additive were initially charged and masticated for about 30 seconds within a 60 gram Brabender internal mixer. The carbon black, stearic acid, wax, antioxidant, and zinc oxide were then mixed with the rubber/additive blend for about five minutes at about 110° C. and at about 60 rpm. The composition was dropped and allowed to cool. Subsequent to this step, the sulfur and accelerators were charged, and the entire composition was mixed for about 80 seconds at about 75° C.

The four stocks were individually sheeted and molded at about 165° C. for about 15 minutes. Each recipe was then tested for 50 percent modulus according to ASTM-D 412 at about 22° C. The test specimens were in the form of rings having a width of about 0.05 inch and a thickness of about 0.075 inch. The specimens were tested at a specific gauge length of about 1.0 inch. Hysteresis of the material at 50° C. was measured by using a dynamic mechanical analyzer. The test specimens employed with the dynamic mechanical analyzer were strips having a length of about 1.0 inches, a width of about 0.25 inches, and a thickness of about 0.075 inches. The testing conditions included a 5 Hz temperature ramp and about 1% strain. The results of this testing is set forth in Table II.

TABLE II

| Stock | Damping Additives | 50% Young's modulus at 23° C. (psi) | tan (δ) at 50° C. |
|---|---|---|---|
| 1 | Linear liquid polybutadiene | 110.0 | 0.17 |
| 2 | light aromatic processing oil | 107.3 | 0.18 |
| 3 | heavy aromatic processing oil | 108.7 | 0.19 |
| 4 | hyper-branched polymer | 122.6 | 0.25 |

As can be seen from the foregoing data, the tire recipe that included the hyper-branched polymer, i.e., Stock No. 4, exhibited the highest damping as indicated by the large $\tan(\delta)$ value.

Additionally, the stock containing the hyper-branched polymer was examined for hysteresis over a wide temperature range. The data obtained from this testing is set forth in Table III.

TABLE III

| Stock | Additive | tan (δ) 35° C. | tan (δ) 45° C. | tan (δ) 55° C. | tan (δ) 65° C. | tan (δ) 75° C. | tan (δ) 85° C. | tan (δ) 95° C. |
|---|---|---|---|---|---|---|---|---|
| 4 | hyper-branched polymer | 0.246 | 0.250 | 0.253 | 0.251 | 0.247 | 0.246 | 0.244 |

Notably, the material exhibited a constant tan(δ) plateau over a temperature range from about 35 to about 95° C.

Experiment II

Three rubber compositions were prepared according to the general recipe set forth in Table IV.

TABLE IV

| | Parts by Weight |
|---|---|
| Elastomeric Binder | 100 |
| Damping Additive | 100 |
| Stearic Acid | 1.5 |
| Zinc Oxide | 2.5 |
| | 204.00 |
| Sulfur | ~2.5 |
| Accelerator | 1.5 |
| | 4.00 |
| | 208.00 |

The elastomeric binder that was employed was EPDM (ethylene-propylene diene terpolymer) obtained from Exxon Chemicals under the tradename Vistalon® 6505. The accelerator that was used was benzolthiazyl disulfide. The accelerator, stearic acid, zinc oxide, and sulfur are conventionally used in the art and are commercially available from many sources.

As noted in Table IV, each of the three rubber compositions included a damping additive that was different for each stock. The first stock included a paraffin oil that was obtained from Idemitsu Corporation of Japan under the tradename PW380. The second stock included a hyper-branched polymer in accordance with the present invention. And, the third stock having a low sulfur content included a paraffin oil that was obtained from Idemitsu Corporation of Japan under the tradename PW380.

The hyper-branched polymer was prepared by crosslinking a liquid hydroxy-terminated hydrogenated polyisoprene prepolymer, which was obtained from Kurary Inc. of Japan under the tradename TH-21, with toluene 2,4-diisocyanate. Specifically, various reaction mixtures were prepared. These mixtures were mixed at about 22° C. for about one hour in order to dissolve a crosslink agent into the prepolymer. The resulting polymeric mixtures were then allowed to react at 70° C. for about three days. The hyper-branched polymer selected for the experiment was prepared from the reaction of 19.74 grams of hydroxy-terminated EPR and 0.66 grams of toluene 2,4-diisocyanate. The polymer showed a relatively constant tan(δ) plateau with tan(δ)=1.2±0.3 over a temperature range from about 40 to about 100° C. The $T_g$ of the hyper-branched polymer is about −40° C., as determined by DSC.

The EPDM polymer rubber was initially charged at 110° C. and mixed for about one minute within a 300 gram Brabender internal mixer at an agitation speed of 60 rpm. The damping additive, stearic acid, and zinc oxide were subsequently charged over the course of about 15 minutes while mixing continued. The mixture was then masticated for another 15 minutes, dropped, and cooled. Once cooled to about 75° C., mixing was continued for about 30 seconds and the curing agent and accelerator was added. Mixing was continued for another 90 seconds and the composition was removed from the internal mixer.

The three stocks were individually sheeted and molded at about 160° C. for about 30 minutes. Each stock was then tested for 50% modulus according to ASTM-D 412 at about 22° C. Tensile strength at break and elongation at break were likewise determined according to ASTM-D 412 at 22° C. For purposes of this testing, the test specimens were in the form of rings having a width of about 0.05 inches and a thickness of 0.075 inches. The specimens were tested at a specific gauge length of about 1.0 inch. Hysteresis was measured by using a dynamic mechanical analyzer as set forth above. The test specimens were strips having a length of about 1.0 inches, a width of about 0.25 inches, and a thickness of about 0.075 inches. The testing condition was 1 Hz and about 1% strain. The glass transition temperature ($T_g$) of each stock was determined by the tan(δ) peak. The results of this testing is set forth in Table V.

TABLE V

| Stock | Damping Additive | 50% Young's modulus at 23° C. (psi) | Tensile at Break (psi) | Elongation at Break (psi) | tan (δ) at −20° C. | tan (δ) at 5° C. | tan (δ) at 20° C. | tan (δ) at 50° C. | Tg (measured by tan δ peak) |
|---|---|---|---|---|---|---|---|---|---|
| 5 | Paraffin oil (PW380) | 9.83 | 130 | 1429 | 0.15 | 0.12 | 0.11 | 0.09 | −41 |
| 6 | Hyper-Branched polymer (Sample 1) | 10.15 | 180 | 1474 | 0.39 | 0.29 | 0.25 | 0.20 | −38 |
| 7 | Paraffin oil (PW380), low sulfur content | 5.83 | — | — | 0.13 | 0.13 | 0.15 | 0.15 | −42 |

As can be seen by the foregoing data, the EPDM rubber composition including the hyper-branched polymer (Stock 6) exhibits the highest damping properties among the other EPDM rubber compounds. Likewise, the EPDM rubber composition including the hyper-branched polymer exhibited superior mechanical properties.

Experiment III

Three rubber compositions were prepared according to the general recipe set forth in Table VI hereinbelow:

TABLE VI

| | Parts by Weight | |
|---|---|---|
| Elastomeric Binder | 100 | |
| Carbon Black | 100 | |
| Damping Additive | 100 | |
| Stearic Acid | 1.5 | |
| Zinc Oxide | 2.5 | |
| | | 304.00 |
| Sulfur | ~2.5 | |
| Accelerator | 1.5 | |
| | | 4.00 |
| | | 308.00 |

The elastomeric that was employed was EPDM (ethylene-propylene diene terpolymer) obtained from Exxon Chemicals under the tradename Vistalon® 6505. The accelerator that was used was benzolthiazyl disulfide. The accelerator, stearic acid, zinc oxide, and sulfur are conventionally used in the art and are commercially available from many sources. The carbon black that was employed was an intermediate abrasion furnace-black (N110) that is commercially available from a number of sources. The accelerator, carbon black, stearic acid, zinc oxide, and sulfur are conventionally used in the art and commercially available from a number of sources.

As noted in Table VI, each of the three rubber compositions included a damping additive that was different for each stock. The first stock included a paraffin oil that was obtained from Idemitsu Corporation under the tradename PW380. The second stock included a hyper-branched polymer in accordance with the present invention. And, the third stock included a paraffin oil having a low sulfur content that was obtained from Idemitsu Corporation under the tradename PW380.

The hyper-branched polymer was prepared by crosslinking a liquid hydroxy-terminated hydrogenated polyisoprene, which was obtained from Kurary Inc. under the tradename TH-21, with toluene 2,4-diisocyanate. Specifically, various reaction mixtures were prepared, and the reaction mixture that showed a relatively constant tan (δ) plateau was selected as the hyper-branched polymer additive of choice. These mixtures were mixed at about 22° C. for about one hour in order to dissolve the crosslinking agent into the polymer. The experimental polymers were then cured at 70° C. for about three days. The hyper-branched polymer selected for the experiment was prepared from the reaction of 19.739 grams of hydroxy-terminated polyisoprene and 0.66 grams of toluene 2,4-diisocyanate. The $T_g$ of the hyper-branched polymer is about -40° C., as measured by DSC.

The EPDM polymer rubber was initially charged at 110° C. and mixed for about one minute within a 300 gram Brabender internal mixer at an agitation speed of 60 rpm. The damping additive, carbon black, stearic acid, and zinc oxide were subsequently charged over the course of about 5 minutes while mixing continued. The mixture was then dropped and cooled. Once cooled to about 75° C., mixing was continued for about 30 seconds and the curing agent and accelerator were added. Mixing was continued for another 45 seconds and the composition was removed from the internal mixer.

The three stocks were individually sheeted and molded at about 160° C. for about 30 minutes. Each stock was then tested for 50% modulus according to ASTM-D 412 at about 22° C. Tensile strength at break and elongation at break were likewise determined according to ASTM-D 412 at 22° C. For purposes of this testing, the test specimens were in the form of rings having a width of about 0.05 inches and a thickness of 0.075 inches. The specimens were tested at a specific gauge length of about 1.0 inch.

Each sample was also tested for wet traction by using the British Portable Skid Tester according to the procedure set forth in the Road Research Laboratory Technical Paper No. 66 by Giles et al., London (1966). The sample geometry for the test was a rectangular bar having the dimensions of 1×3×0.25 inches.

Hysteresis was measured using a dynamic mechanical analyzer at about 0° C. The test specimens were strips having a length of about 1.0 inches, a width of about 0.25 inches, and a thickness of about 0.075 inches. The measurements were performed at 1 Hz and about 1 percent strain. The results of this testing is set forth in Table VII.

TABLE VII

| Stock | Damping Additive | 50% Youngs's Modulus at 23° C. (psi) | Shore A Hardness | Tensile at Break (psi) | Elongation at Break (psi) | G' (at 0° C. dyn/cm$^2$) | tan (δ) (at 0° C.) | Stanley London Index |
|---|---|---|---|---|---|---|---|---|
| 8 | Paraffin oil (PW380) | 123 | 52.7 | 1427 | 482 | 1.3 × 10$^8$ | 0.182 | 33 |
| 9 | Hyper-Branched polymer (Sample 1) | 145 | 55.1 | 978 | 773 | 1.4 × 10$^8$ | 0.230 | 38 |
| 10 | Paraffin oil (PW380), low sulfur content | 118 | 51.7 | 1532 | 536 | 1.1 × 10$^8$ | 0.174 | 32 |

Based upon the foregoing data, it should be evident that the vulcanizate stock (Stock 9) according to the present invention demonstrated superior damping as evidenced by tan(δ) at 0° C. of about 0.230, which corresponds to about 26 percent improvement over the controls, as well as a superior wet traction of 38, as measured by the Stanley London Test which corresponds to about 15 percent improvement over the controls.

Based on the relatively constant tan(δ) obtained over the broad temperature range as demonstrated from the above data, it should be understood that the technology including a hyper-branched polymers in rubber recipes improves the damping properties of many important rubber applications including tires.

foregoing disclosure, it should now be apparent that the addition of hyper-branched polymers to rubber binders as described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, tire recipes or vulcanizable compositions of matter according to the present invention are not necessarily limited to those described herein inasmuch as it is believed that the addition of the hyper-branched polymers to any useful rubber or tire recipe will improve the damping thereof. Thus, the scope of the invention shall include all modifications and variations that may fall within the scope of the attached claims.

What is claimed is:

1. A method for increasing the damping properties of tire rubber comprising the steps of:

adding a saturated damping additive to a vulcanizable composition of matter, where said damping additive comprises a hyper-branched polymer that is formed by crosslinking a functionalized polymer with a multi-functional crosslinking agent, and where the extent to which the functionalized polymer is crosslinked by the multi-functional crosslinking agent is defined by the following formula $$E = \frac{|r - r_{gel}|}{r_{gel}}$$

where E is the relative distance to the gel point and is a value of less than 1, $r$ is the extent of the reaction, and $r_{gel}$ is the extent of the reaction at the gel point; and processing the vulcanizable composition of matter containing the damping additive into tire rubber.

2. A method, as set forth in claim 1, where said damping additive is characterized by having a tan($\delta$) that is greater than or equal to about 0.35 in the temperature range from about −20° C. to about 120° C.

3. A method, as set forth in claim 2, where said damping additive is characterized by having a substantially constant tan($\delta$) within the temperature range from about −20° C. to about 120° C.

4. A method, as set forth in claim 3, where said damping additive is characterized by having a glass transition temperature that is less than or equal to about −20° C.

5. A method, as set forth in claim 1, where E is a value of less than 0.2.

6. A method, as set forth in claim 5, where the vulcanizable composition of matter comprises an elastomer, and at least one reinforcing filler.

7. A method, as set forth in claim 5, where said step of processing the vulcanizable composition of matter includes adding a vulcanizing agent to the composition and effecting vulcanization.

8. A method, as set forth in claim 5, where the crosslinking occurs via a reaction between a carboxyl and hydroxyl group, an amino group and carboxyl group, an isocyanate and hydroxyl group, an epoxy group and amino group, or an anhydride group and amino group.

9. A method, as set forth in claim 5, where said hyper-branched polymer is formed by crosslinking a hydroxy-terminated polybutadiene prepolymer with a diisocyanate crosslinking agent, or a hydroxy-terminated ethylene-propylene prepolymer with a diisocyanate crosslinking agent, or a hydroxy-terminated polyisoprene prepolymer with a diisocyanate crosslinking agent.

10. A tire component comprising:

a vulcanized elastomeric matrix; and from about 10 to about 1,000 parts by weight of a saturated damping additive per one hundred parts by weight rubber, where said damping additive is dispersed within said vulcanized elastomeric matrix, and where said damping additive comprises a hyper-branched polymer that is formed by crosslinking a functionalized polymer with a multi-functional crosslinking agent, and where the extent to which the functionalized polymer is crosslinked by the multi-functional crosslinking agent is defined by the following formula $$E = \frac{|r - r_{gel}|}{r_{gel}}$$

where E is the relative distance to the gel point and is a value of less than 1, $r$ is the extent of the reaction, and $r_{gel}$ is the extent of the reaction at the gel point.

11. A tire component, as set forth in claim 10, where said tire component is a tire tread.

12. A tire component, as set forth in claim 11, where the vulcanizable composition of matter comprises an elastomer, at least one reinforcing filler, and at least one vulcanizing agent.

13. A tire component, as set forth in claim 12, where said damping additive is characterized by having a tan($\delta$) that is greater than or equal to about 0.35 in the temperature range from about −20° C. to about 120° C.

14. A tire component, as set forth in claim 13, where said damping additive is characterized by having a substantially constant tan($\delta$) within the temperature range from about −20° C. to about 120° C.

15. A tire component, as set forth in claim 14, where said damping additive is characterized by having a glass transition temperature that is less than or equal to about −20° C.

16. A tire component, as set forth in claim 10, where E is a value of less than 0.2.

17. A tire component, as set forth in claim 16, where E is a value of less than 0.1.

18. A tire component, as set forth in claim 17, where the crosslinking occurs via a reaction between a carboxyl and hydroxyl group, an amino group and carboxyl group, an isocyanate and hydroxyl group, an epoxy group and amino group, or an anhydride group and amino group.

19. A tire component, as set forth in claim 17, where said hyper-branched polymer is formed by crosslinking a hydroxy-terminated polybutadiene prepolymer with a diisocyanate crosslinking agent, or a hydroxy-terminated ethylene-propylene prepolymer with a diisocyanate crosslinking agent, or a hydroxy-terminated polyisoprene prepolymer with a diisocyanate crosslinking agent.

20. The method of claim 5, where E is a value of less than 0.1.

21. The method of claim 5, where E is a value of less than 0.05.

22. The tire component of claim 17, where E is a value of less than 0.05.

* * * * *